United States Patent [19]
Egi et al.

[11] Patent Number: 5,547,545
[45] Date of Patent: Aug. 20, 1996

[54] DIGESTER TEMPERATURE DISTRIBUTION CONTROL SYSTEM

[75] Inventors: Hiroshi Egi, Matsudo; Kazuhisa Toyama, Urawa, both of Japan

[73] Assignee: Kabushiki Kaisha Toshiba, Kawasaki, Japan

[21] Appl. No.: 233,986

[22] Filed: Apr. 28, 1994

[51] Int. Cl.$^6$ .............................. D21C 7/12; D21C 7/10; D21C 7/00

[52] U.S. Cl. .......................... 162/238; 162/252; 162/263; 162/233

[58] Field of Search ........................... 162/233, DIG. 10, 162/61, 199, 272, 238, 252, 263, 232, 237, 198, 17, 250

[56] References Cited

U.S. PATENT DOCUMENTS

| | | | |
|---|---|---|---|
| 3,322,616 | 5/1967 | Hutchinson et al. | 162/238 |
| 3,617,717 | 11/1971 | Smith | 162/238 |
| 4,800,266 | 1/1989 | Poorman | 250/277 |
| 4,990,219 | 2/1991 | Beller et al. | 162/238 |
| 5,028,146 | 7/1991 | Wada | 374/131 |
| 5,222,810 | 6/1993 | Kleinerman | 374/161 |
| 5,236,554 | 8/1993 | Greenwood | 162/238 |

FOREIGN PATENT DOCUMENTS

| | | | |
|---|---|---|---|
| 919289 | 1/1973 | Canada | 341/35 |
| 0225023 | 6/1987 | European Pat. Off. . | |
| 0457941 | 11/1991 | European Pat. Off. . | |
| 0572238 | 12/1993 | European Pat. Off. . | |
| 227539 | 11/1969 | Sweden . | |

OTHER PUBLICATIONS

"Multipoint Temperature Monitoring in a Hazardous Environment", Massime Brenci et al., Jan. 29–31, 1992, 8th Optical Sensors Conference, IEEE lasers and Electro–Optics Society and Optical Society of America, pp. 97–100.

Paper Trade Journal, pp. 47–51, Sep. 14, 1964, Donald M. Morrison, "Changes in Kraft Continuous Digester Instrumentation".

Electrical Review, vol. 255, No. 16, "Finding Fault with Cables", pp. 29–33, Aug. 21–Sep. 3, 1992.

*Primary Examiner*—Donald E. Czaja
*Assistant Examiner*—Jose A. Fortuna
*Attorney, Agent, or Firm*—Oblon, Spivak, McClelland, Maier & Neustadt, P.C.

[57] ABSTRACT

A digester temperature distribution control system comprises an optical fiber type temperature measuring unit utilizing the Raman scattering effect, reference temperature measuring unit, reference point temperature setting unit, measured temperature distribution calculating unit, target temperature distribution calculating unit and control unit. The optical fiber type temperature measuring unit is provided in that digester charged with chips and equipped with control valves for controlling steam for heating the charged chip mass in the digester and is adapted to detect temperature at a plurality of points in a length thereof including a given reference point in the digester. The control unit controls the control valves so as to allow a difference between a measured temperature distribution obtained through the optical fiber type temperature measuring unit, reference temperature measuring unit, reference temperature setting unit and measured temperature distribution calculating unit and a target temperature distribution obtained through the target temperature distribution calculating unit to be set in a range of a preset value.

7 Claims, 6 Drawing Sheets

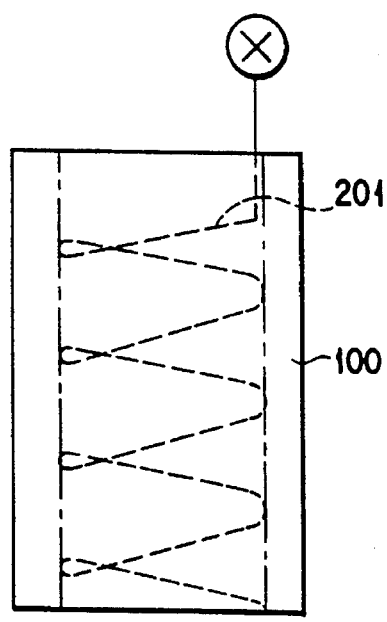
F I G. 8
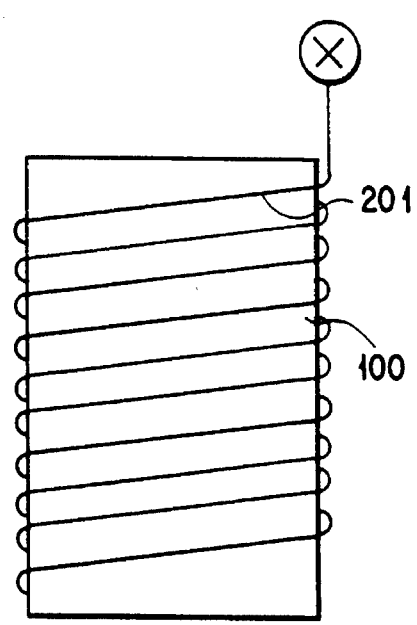
F I G. 9
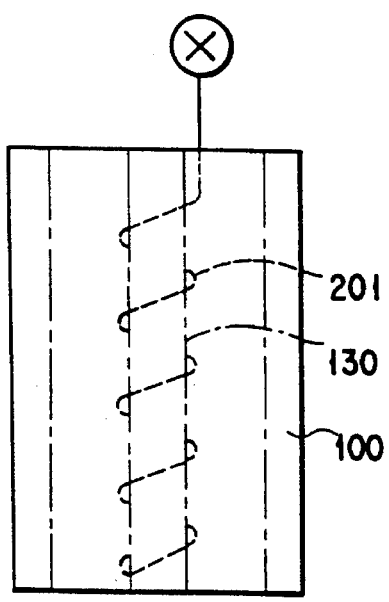
F I G. 10
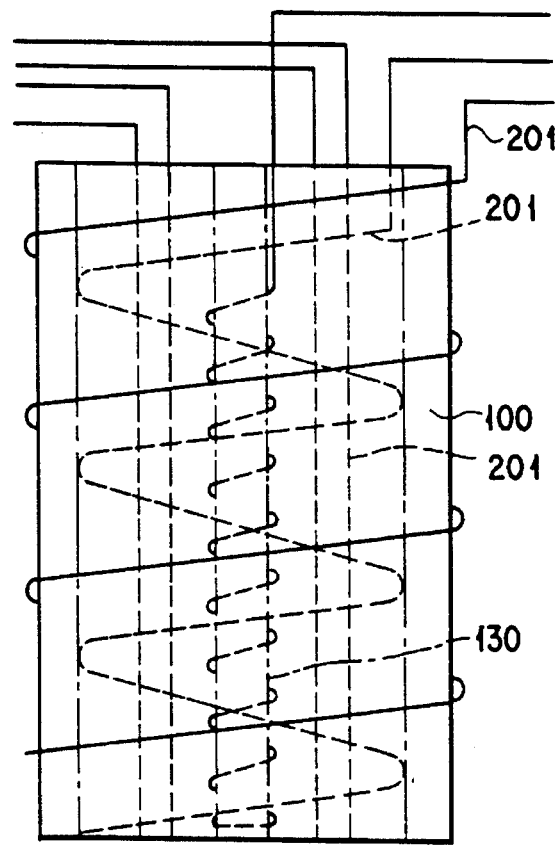
F I G. 11

DIGESTER TEMPERATURE DISTRIBUTION CONTROL SYSTEM

BACKGROUND OF THE INVENTION

1. Field of the Invention

The present invention relates to a system for controlling the temperature distribution of a charged chip mass in a digester, such as a continuous digester for continuously making pulp.

2. Description of the Related Art

In a paper manufacturing plant, a continuous digester has conventionally been used as a digester. In the continuous digester, wood is broken or cut to small chips and pulp, a raw material for paper, is continuously manufactured from the small chips. In the continuous digester, the wood chips are heated or cooked with the use of an alkali solution and broken down into lignin and cellulose portions. By washing the cellulose portions, it is possible to obtain pulp, that is, the raw material for paper. The chips are supplied into the continuous digester from above with the chips closely packed in the digester, a resultant chip mass descends toward a lower zone, while being reacted with the alkali solution. The cellulose portion (pulp) is washed with a washing liquid fed from the bottom of the digester and is drawn from the digester bottom.

In this case, it is necessary that the pulp be comprised of a pure cellulose portion alone free from any lignin contents. Further, the longer the charged chip mass is heated at high temperature, the more the lignin is degraded. However, there occurs a loss in the cellulose portion, that is, a loss in the raw material either. It is, therefore, necessary to heat the chip mass at a suitable temperature for a proper time period only. In this case, it is to be noted that the extent of heating above is called a "heated" state, represented by an H factor.

It is, therefore, very important to measure the temperature distribution of the chip mass in the digester, that is, in such a continuous digester, and to control the temperature so that the charged chip mass in the digester may take on an appropriate temperature distribution. This is very important to achieve high quality, high efficiency and high resource savings in the making of paper.

SUMMARY OF THE INVENTION

It is accordingly the object of the present invention to provide a digester temperature distribution control system which, without preventing a flow of a charged chip mass through the digester, can measure temperature distribution prevalent in the digester and can control that temperature so that the chip mass charged in the digester may take on an appropriate temperature distribution.

The above-mentioned object of the present invention can be achieved by the digester temperature distribution control system as will be set out below.

That is, according to the present invention, there is provided a digester temperature distribution control system comprising:

wire like temperature detecting means, provided relative to that digester charged with chips, for detecting temperature at a plurality of points in a length thereof;

temperature distribution measuring means for measuring temperature distribution of a charged chip mass in the digester on the basis of an output of the wire like temperature detecting means;

heating means for heating the charged chip mass in the digester; and control means for controlling the heating means on the basis of an output of the temperature distribution measuring means so as to allow the charged chip mass in the digester to have a predetermined temperature distribution.

The above-mentioned object of the present invention is achieved by the following digester temperature distribution control system adapted to use control valves for controlling steam so as to heat a charged chip mass in a digester. That is, a digester temperature distribution control system comprises:

an optical fiber type temperature measuring unit provided relative to the digester, for detesting temperature at a plurality of points in a length thereof including a predetermined reference point in the digester, the optical fiber type temperature measuring unit utilizing the Raman scattering effect;

a reference temperature measuring unit provided at the reference point in the digester and measuring a reference point temperature signal as a reference temperature signal;

a reference point temperature setting unit for setting a temperature on the reference point at the optical fiber type temperature measuring unit by calibrating the reference point temperature signal which is output from the optical fiber type temperature measuring unit by a reference temperature signal measured by the reference temperature measuring unit;

a measured temperature distribution calculating unit for calculating a measured temperature distribution in the charged chip mass of the digester on the basis of the reference point temperature signal output from the reference point temperature setting unit and temperature signals on the plurality of points output from the optical fiber type temperature measuring unit;

a target temperature distribution calculating unit for calculating a target temperature distribution of the charged chip mass in the digester on the basis of a target quantity of pulp production and temperature gradient restriction of the digester; and control means for controlling the control valve means so as to allow a difference between the measured temperature distribution and the target temperature distribution to be set to be in a range of a preset value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 8 shows another form of application of the optical fiber type thermometer to the digester; FIG. 9 shows another form of application of the optical fiber type thermometer to the digester; FIG. 10 shows another form of application of the optical fiber type thermometer to the digester; FIG. 11 shows another form of application of optical fiber type thermometers to the digester.

DETAILED DESCRIPTION OF THE PREFERRED EMBODIMENTS

A digester temperature distribution control system according to a preferred embodiment of the present invention will be explained below in more detail.

Figure 1:
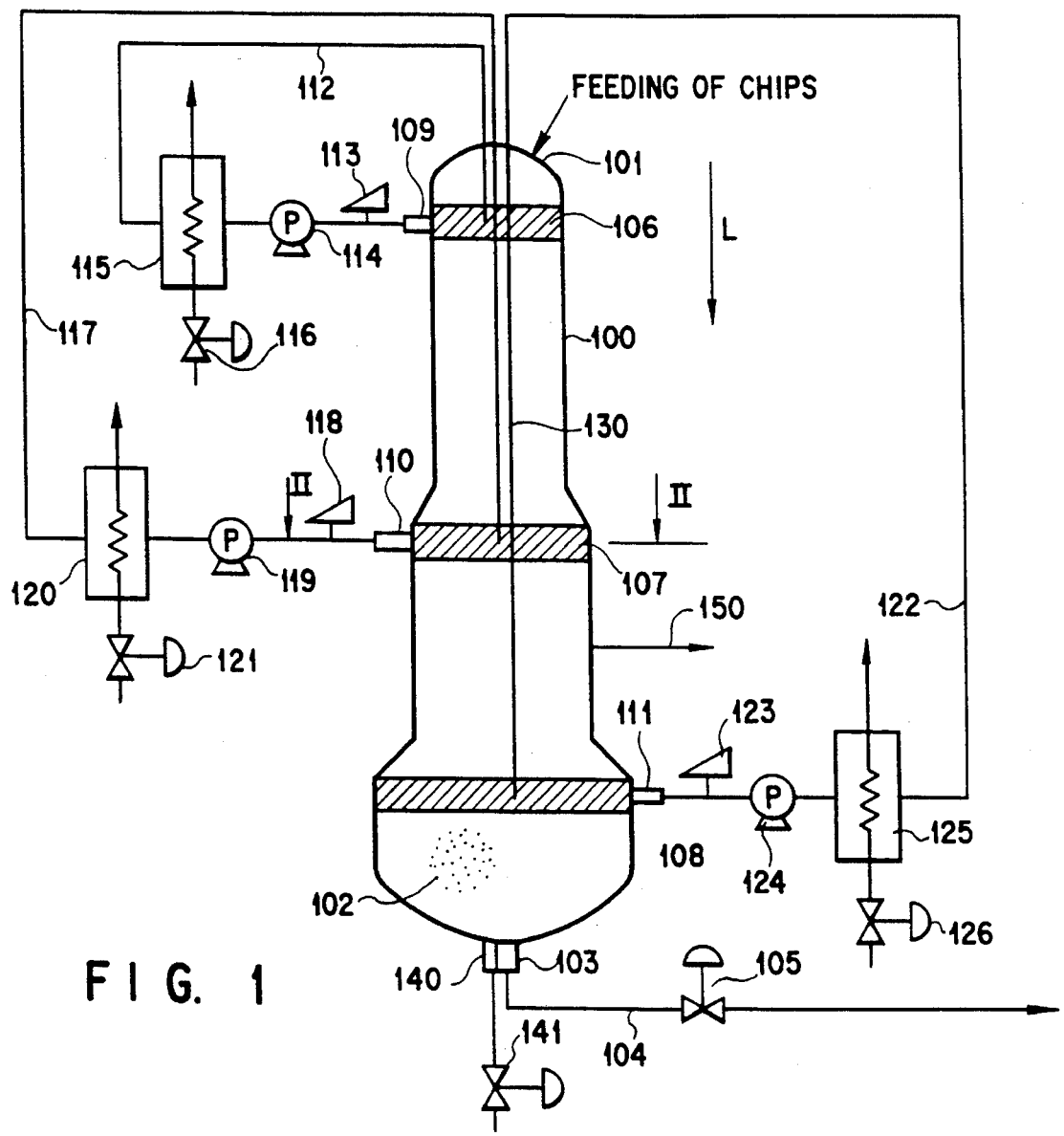
FIG. 1 is a diagrammatic diagram showing one form of a continuous digester of a paper making plant applied to the present invention.
Figure 2:
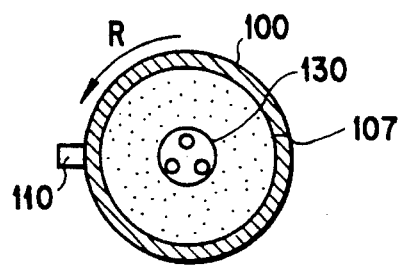
FIG. 2 is a cross-sectional view as taken along line II—II in FIG. 1.

First the digester to which the present invention is applied will be explained below with reference to FIGS. 1 and 2. That is, a continuous digester 100 adopted in the paper manufacturing plant has a chip charging inlet 101 on the top side through which chips are charged into the digester. The chips, being closely packed in the digester, are moved as a chip mass downwardly while being reacted with an alkali solution. A discharge outlet 103 is provided on the digester bottom side so as to discharge a cellulose portion (pulp). A pipe 104 is connected to the discharge outlet 103. A valve 105 is attached to the pipe 104 so as to control an amount of discharge of the cellulose portion (pulp). A plurality of (here, three) liquid extraction sections 109, 110 and 111 are provided at the digester 100 along the depth direction of the chip mass. Filters (Strainers) 106, 107 and 108 are located at those areas corresponding to the liquid extraction sections 109, 110 and 111 in the digester 100. Through the filters 106, 107 and 108, a liquid is extracted from the digester 100. A pipe 112 is attached at one end to the liquid extraction section 109 and the other end of the pipe 112 is introduced as a center pipe 130 into the digester. A thermometer 113, pump 114, heater 115 (using steam) and amount-of-steam adjusting valve 116 are provided on the pipe 112. Similarly, one end of a pipe 117 is connected to the liquid extraction section 110, while the other end of the pipe 117 is introduced as the center pipe 130 into the digester. A thermometer 118, pump 119, heat exchanger 120 (using steam) and amount-of-steam adjusting valve 121 are provided on the pipe 117. Similarly, one end of a pipe 122 is connected to the liquid extraction section 111. The other end of the pipe 122 is introduced as the center pipe 130 into the digester. A thermometer 123, pump 124, heat exchanger 125 (using steam) and amount-of-steam adjusting valve 126 are provided on the pipe 122.

In the present invention, the depth direction of the chip mass (flowing direction of the chip mass, that is, up/down direction of the chip mass) is given by L and the circumferential inner wall direction of the digester is by R. The inner wall direction R of the digester is given intended to mean the digester's whole circumferential inner wall direction along which the chip mass is moved. According to the present invention it is possible to control temperature distribution in the depth direction L and/or temperature distribution in the circumferential inner wall direction R. The temperature of the chip mass in the digester can be adjusted by properly adjusting the valves 116, 121 and 126. That is, the temperature distribution in the depth direction L and/or temperature distribution in the circumferential inner wall direction R of the chip mass can be controlled by adjusting the valves 116, 121 and 126. In the present invention, it is important to measure temperature in the digester as well as a temperature in the chips charged in the digester. In a preferred embodiment as will be set out below, therefore, the temperature distribution in the depth direction L of the chips and/or temperature distribution in the circumferential inner wall direction R is measured using an optical fiber type thermometer 200.

A washing liquid supply section 140 is provided on the bottom side of the digester A washing liquid is supplied from the washing liquid supply section 140 into the digester where the cellulose portion (pulp) is washed. The amount of washing liquid to be supplied into the digester is adjusted by a valve 141.

Figure 3:
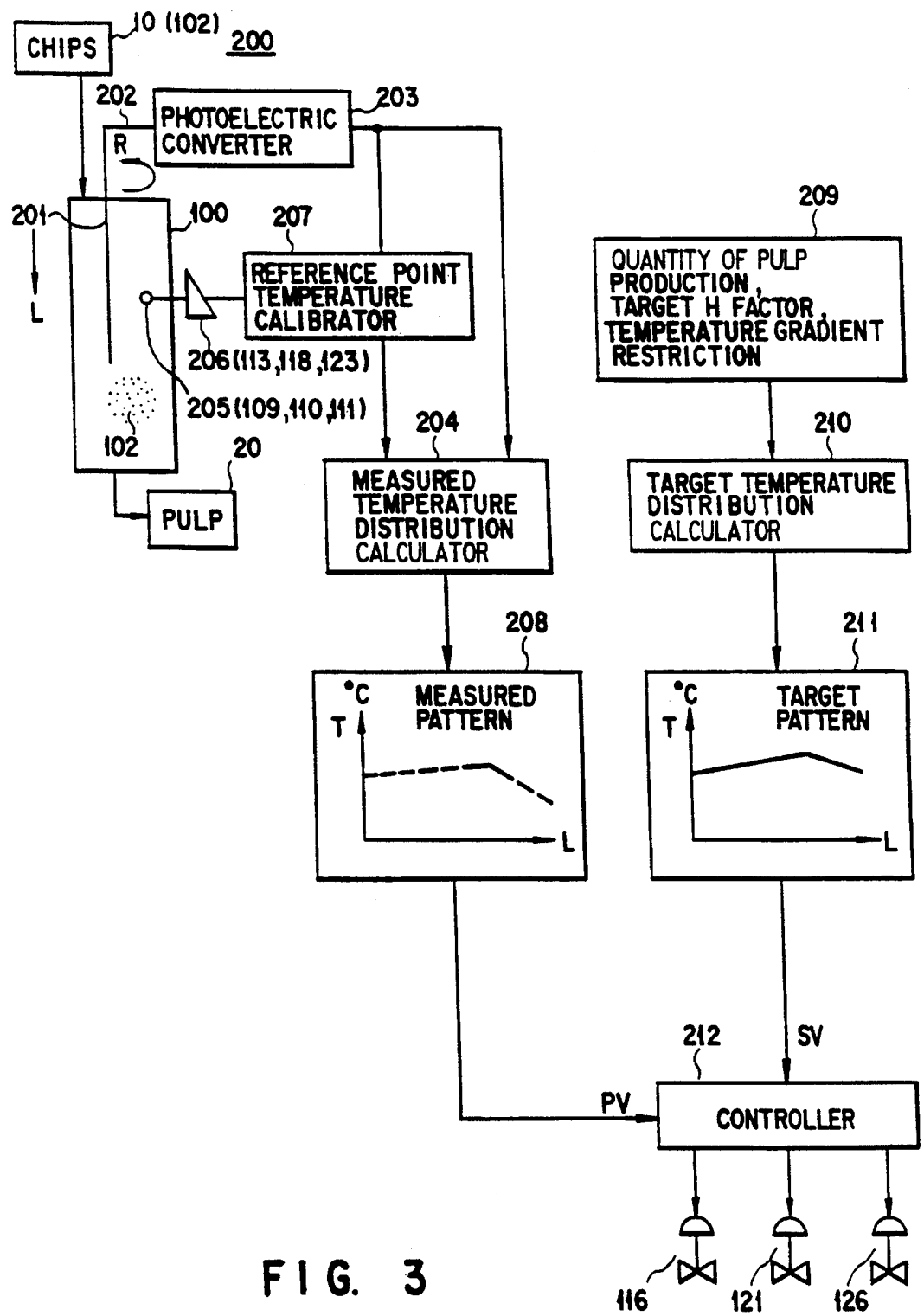
FIG. 3 is a block diagram showing a digester temperature distribution control system according to the present invention.

As will be seen from FIG. 3, chips 10 are charged, from above, into a digester 100 according to the preferred embodiment of the present invention and pulp 20 is discharged from the bottom of the digester. In the preferred embodiment of the present invention, use is made of an optical fiber type thermometer 200 to which the Raman scattering effect is applied. Thermal vibrations of the molecular structure of the fiber produce the relatively weak scattering effect Raman scattering changes the wavelength of the scattered light (reference to Electrical Review Vol. 255, No. 16: Finding Fault with Cables; 21 Aug.–3 Sep. 1992). The thermometer 200 comprises a sensing section 201 with a cross-section of a core shown in FIG. 4, a cable section 202 (201) whose cross-section is shown in detail in FIG. 5 and photoelectric converter 203.

Figure 4:
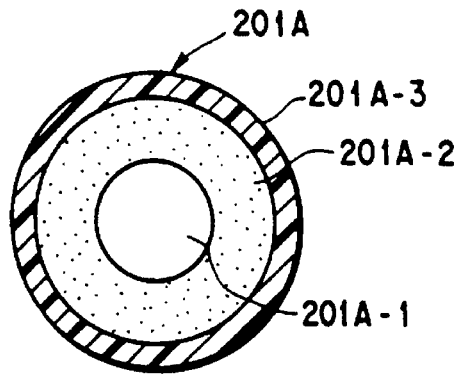
FIG. 4 is a cross-sectional view showing a core section of an optical fiber type thermometer.

Two types of sensing sections 201 are provided, that is, an S type that a PFA (perfluoro-alkoxyfluoro plastic; resin) layer 201A-3 is covered on the outer peripheral surface of a thermosetting silicon layer 201A-2 with an optical fiber glass 201A-1 defined therein as shown in FIG. 4.

Figure 5:
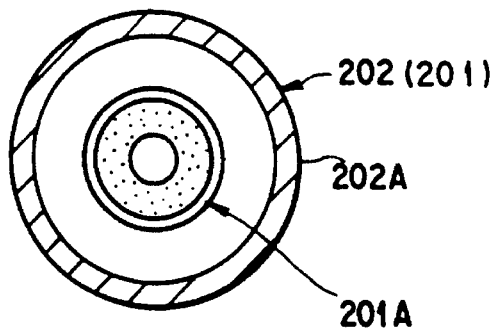
FIG. 5 is a cross-sectional view showing an optical fiber's cable.

As shown in FIG. 5, the cable section 202 (201) is of such a type that an S-type core 201A is held within a flexible or a nonflexible stainless pipe 202A.

The optical fiber type thermometer 200 utilizes the Raman scattering effect on the optical fiber. When a light pulse is incident on the optical fiber, scattering light is reflected from each point on the optical fiber. The scattering light is separated into a low and a high frequency component. One of these components is related to the physical properties of the optical fiber and the other component to the physical properties and temperature on a reflection surface. It is, therefore, possible to measure the temperature of the reflection surface from an intensity ratio between the above-mentioned frequency components. It is also possible to calculate a distribution in a direction of distance of the optical fiber by finding a time at which reflected light is returned back, that is, to measure a temperature at each point on the optical fiber in a direction in which the optical fiber extends.

The optical fiber type thermometer 200 is a line of 1 to 4 mm in outer dimension and is of such a type as to be covered with metal and has the following advantages. That is, the thermometer 200 provides less obstacle even if it is inserted into the passage of the charged mass of chips in the digester 100. Even if the fiber of the thermometer 200 is coiled around the digester 100, it is possible to detect the temperature distribution in the circumferential direction of the digester even in the case where there is a variation in the temperature distribution along the circumferential inner wall direction of the charged digester 100.

On the other hand, the optical fiber type thermometer 200 used in the present embodiment is lower in accuracy for detection temperature than a thermometer, such as a temperature measuring resistor and thermocouple, for detecting temperature at a fixed point (one point). In the present embodiment, the temperature of a detection point (a liquid extraction section) 205 at a temperature reference point relative to the digester is detected by the optical fiber type thermometer 200 and temperature-measuring resistor type thermometer 206. The temperature of the thermometer 200 can be calibrated by correcting the detection signal of the thermometer 200 by a detection signal at the detection point 205 supplied from the temperature-measuring resistor type thermometer 206. By setting a plurality of detection points 205 and arranging a corresponding number of temperature measuring resistor type thermometers 206, the calibration accuracy of the optical fiber type thermometer 200 can be much improved.

FIGS. 6 to 11 show various forms of application of the optical fiber type thermometer 200 to the digester 100. In the case where a plurality of such optical fiber type thermometers are arranged relative to the digester, it is possible to measure a temperature distribution pattern in a horizontal cross-sectional direction. It is also possible to make the same measurement as set out above even in the case where the optical fiber type thermometer is coiled around the digester. If such an optical fiber is wound around the outer peripheral wall of the digester, an error resulting from heat transmission in the digester is corrected by means of a calibration method using a reference point temperature detection sensor.

Figure 6:
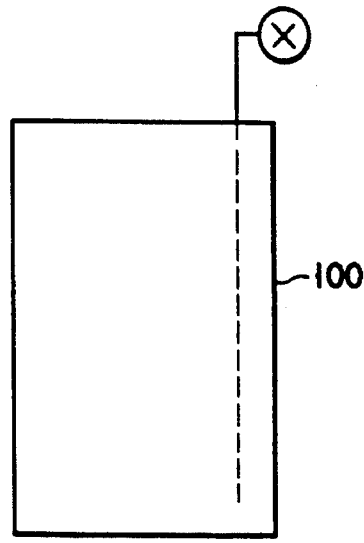
FIG. 6 shows one form of application of the optical fiber type thermometer to a digester.
Figure 7:
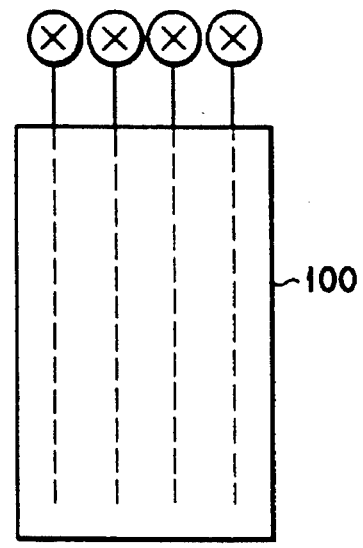
FIG. 7 shows another form of application of optical fiber type thermometers to the digester.

In the applied form as shown in FIG. 6, one sensing section 201 is vertically arranged on the circumferential inner wall of a digester 100. In the form of application as shown in FIG. 7, a plurality of sensing sections 201 are arranged on the inner wall of a digester 100. In the application as shown in FIG. 8, one sensing section 201 is helically arranged on the inner wall of a digester 100. In the applied form as shown in FIG. 9, one sensing section 201 is helically wound around an outer wall of a digester 100. In the example as shown in FIG. 10, one sensing section 201 is helically wound on an outer peripheral surface of a center pipe 130 of a digester 100. In the form of application as shown in FIG. 11, a plurality of sensing sections 201, each, are vertically or helically arranged on the inner and outer walls of a digester 100 and on the outer surface of a center pipe 130.

It is to be noted that the sensing section 201 can be located between an inner wall and a filter (a strainer) placed in the digester 100. This can reduce less possibility of the chip mass being obstructed from being flowed or moved in the digester 100.

Referring back to FIG. 3, temperature signals at many points on the digester 100 are obtained, as corresponding electric signals, from the photoelectric converter 203 in the optical fiber type thermometer 200. In this case, the electric signal representing the temperature at many points on the digester is obtained from the optical fiber type thermometer 200 and contains an electric signal representing the temperature at the reference point 205 on the digester 100. Those electric signals obtained from the photoelectric converter 203 show temperature distribution in the depth direction L in the charged chip mass of the digester 100 and/or temperature distribution in the circumferential inner wall direction R of the charged chip mass in the digester (see FIGS. 12 and 13).

The fixed type thermometer 206 is buried in the digester 100 at a location of the reference point 205. The measured temperature value at that reference point 205 is used to calibrate the temperature of the optical fiber type thermometer 200. It is, therefore, necessary that the reference point 205 be set to a selected position in the digester 100 suitable for calibration. By the reference point's temperature value measured by means of the fixed type thermometer 206, the reference point temperature calibrator 207 calibrates an electric signal corresponding to a reference point output from the photoelectric converter 203 and sets the reference point temperature for the optical fiber thermometer 200.

A measured temperature distribution calculator 204 calculates a whole temperature distribution (measured temperature distribution) in the digester 100 on the basis of the electric signal output from the photoelectric converter 203. This measured temperature distribution corresponds to a temperature distribution of a chip mass 102 in the digester 100 in the depth direction L and inner wall direction R (see FIG. 13). Further the measured temperature distribution calculator 204 calibrates the measured temperature distribution by the reference point temperature output from the reference point temperature calibrator 207.

A measured temperature distribution pattern display device 208 displays a measured temperature distribution pattern (measured pattern) calculated by the measured temperature distribution calculator 204. A target data setting device 209 sets a quantity of pulp production, target H factor and temperature gradient restriction. Here, the temperature gradient restriction is intended to mean a restriction on a temperature increasing gradient and temperature decreasing gradient in the digester 100, a temperature restriction value inherent in the digester 100 in the chip passage direction capable of maintaining stable operation.

A target temperature distribution pattern calculator 210 calculates a target temperature distribution pattern on the chip mass 102 on the basis of the quantity of pulp production, target H factor and temperature gradient restriction set by the target data setting device 209.

A target temperature distribution pattern display device 211 displays a target temperature distribution pattern (target pattern) calculated by the target temperature distribution calculator 210.

A controller 212 controls control valves 116, 121 and 126 on the basis of the measured temperature distribution and target temperature distribution. That is, amounts of steam of the heat exchangers 115, 120 and 125 are controlled by the corresponding control valves 116, 121 and 126, respectively, so that the temperature of the chip mass 102 in the digester 100 is adjusted. As a result, the controller 212 adjusts the control valves 116, 121 and 126 so that a difference between the measured temperature distribution and the target temperature distribution can be set to be in a predetermined temperature difference range.

The system of the present invention thus arranged performs the following operations.

In the paper making plant equipped with the continuous digester for the manufacture of pulp from the chips, use is made of the optical fiber type thermometer utilizing the Raman scattering effect. In order to measure the temperature distribution of the chip mass 102 in the continuous digester by means of the optical fiber type thermometer 200 to allow the H factor (a digested state) of the chip mass 102 to be held at a predetermined value, an average temperature distribution pattern is detected in the depth (flowing) direction of the charged chip mass in the digester.

Here, the optical fiber type thermometer 200 is suspended, singly or in plural number, from above into the digester 100, helically arranged on the outer or inner wall of the digester 100 singly or in plural number, or coiled around the center pipe (inner cylinder) of the digester 100, as shown in FIGS. 6 to 10. FIG. 11 shows a combined form of application of the optical fiber type thermometers.

Figure 12:
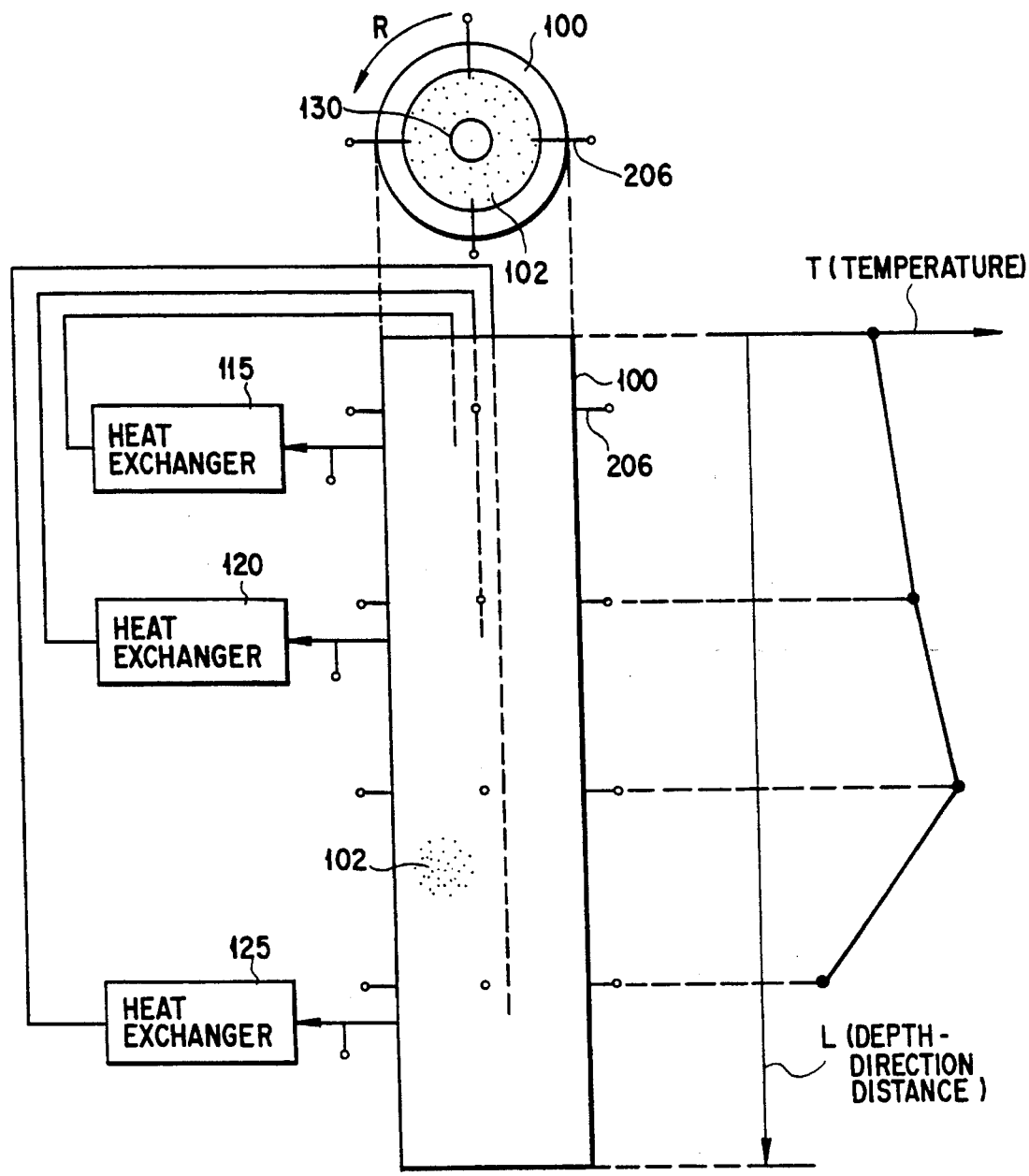
FIG. 12 illustrates a characteristic curve showing a relation of the digester to a temperature distribution in a charged chip mass in the digester in a depth direction.

The optical fiber type thermometer 200 is calibrated by a temperature detection signal on the fixed type thermometer 206 buried in the digester at the location of the reference point 205 and an average temperature curve (measured pattern) is calculated for not only the depth direction distance of the charged chip mass 2 in the digester 0 but also the circumferential inner wall of the digester (see FIG. 12). The control valves 116, 121 and 126 are controlled by finding the flow speed of the charged mass in the digester from the quantity of pulp production and calculating those average temperature reference patterns (target pattern) over the depth direction distance of the charged chip mass 102 and circumferential inner wall distance of the digester for achieving a necessary digested state and making both equal to each other.

Attention should be paid to the matter as will be set out below. That is, since the charged chip mass, being closely packed, is being flowed down through the digester 100, the temperature detection point has to be mounted as a minimal possible projection in the digester 100. If more projections are provided as those temperature detection points on the digester 100, a "hanging" phenomenon occurs at the temperature detection areas due to the blocking of the charged chip mass there. According to the present embodiment, the optical fiber type thermometer 200 is made up of a longer optical fiber and, hence, it is possible to measure temperature at many points along the length of the optical fiber without causing any "hanging" as set out above.

It takes about 8 to 10 hours for the charged chip mass to emerge as an output from the bottom of the digester 100 after the chips have been charged from the top of the digester. It also takes about 8 to 10 hours to recover from any state of deviation, if occurring, from the target temperature distribution pattern. Since the temperature variation detection areas are restricted to those temperature sensing positions only, if any given temperature distribution is deviated in the digester 100, then it takes a few hours to detect such a deviated temperature distribution. According to the present embodiment, on the other hand, the control valves 116, 121 and 126 are controlled normally or intermittently through the comparison of the measured and target patterns. It is, thus, possible to initially prevent the given temperature distribution from being deviated. In this case, the target temperature distribution pattern of the mass (pulp) flowing through the digester 100 is determined from the quantity of pulp production, target H factor and temperature gradient variation restriction. The controlled valves 116, 121 and 126 are so controlled as to allow the measured temperature distribution to coincide with the target temperature distribution pattern. Controlling the control valves 116, 121 and 126 corresponds to controlling the amounts of steam in the corresponding heat exchangers. Since, in this case, temperature control is done only on the area where the heat exchanger is actually provided (the fixed type thermometer is provided), corrections as will be set out below are made so as to realize temperature control throughout the digester 100.

(1) Temperature is controlled near the liquid extraction sections 109, 110 and 111 so as to allow the maximal temperature area in the digester 100 to be set to a predetermined position.

(2) In the case where the measured temperature distribution pattern is deviated from the target temperature distribution pattern, a temperature level corresponding to the H factor is applied, as a correction amount, to the charged chip mass under the control of the control valves 116, 121 and 126.

(3) The above-mentioned correction is applied also to the temperature distribution in the circumferential inner wall direction of the digester 100.

Figure 13:
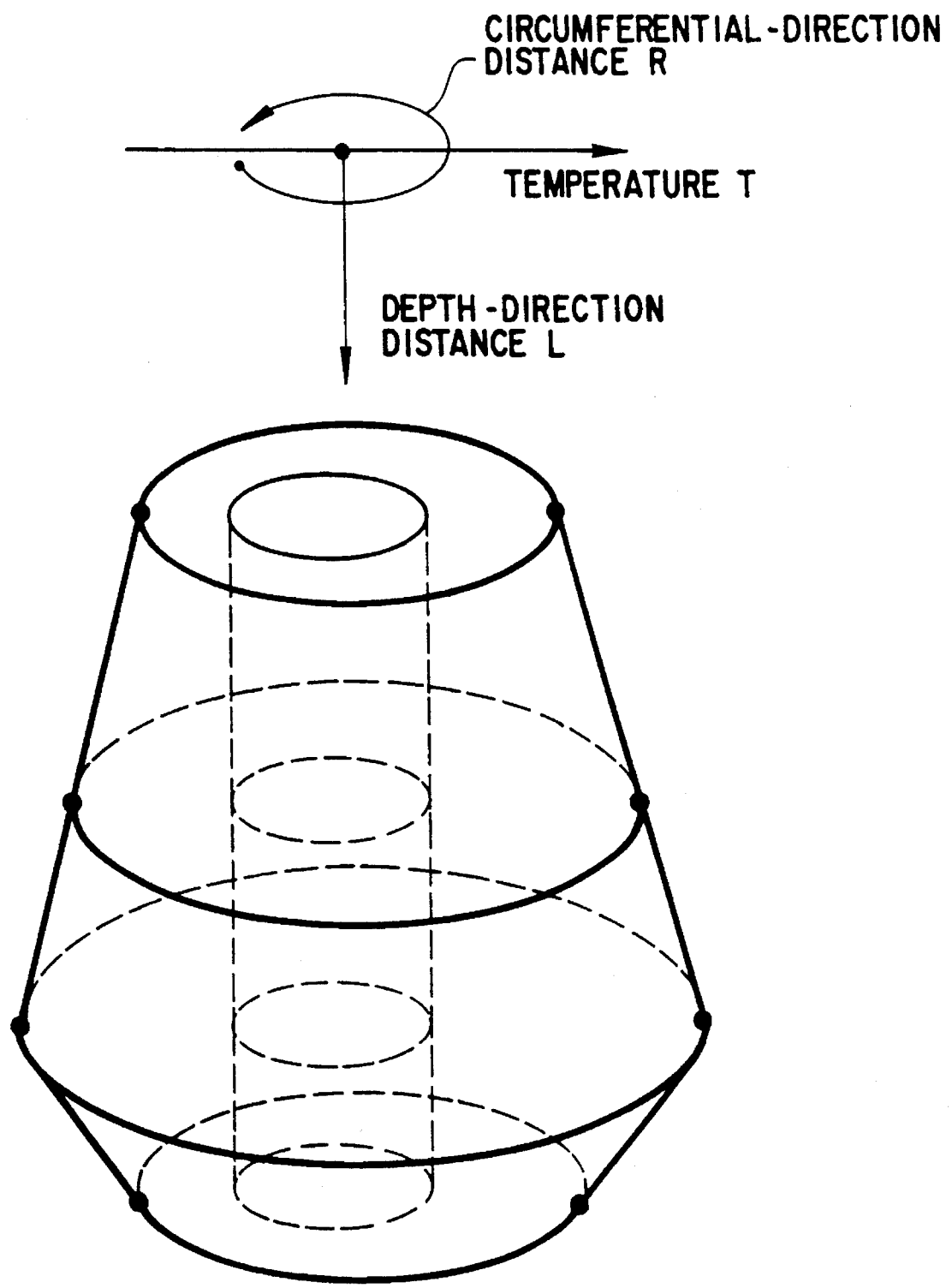
FIG. 13 illustrates a characteristic curve showing temperature distribution both in a depth direction and circumferential inner wall direction of a charged chip mass in the digester.

(4) As the method for correcting the difference of the measured temperature distribution pattern and target temperature distribution pattern, the control valves 116, 121 and 126 are controlled so that a corresponding weighted correction amount may be applied to an area other than the normal passage of the charged chip mass in the digester 100. Setting the H factor in the control of the temperature distribution will be explained below in more detail. FIGS. 12 and 13, each, show a relation of the digester 100 to the temperature distribution (the temperature distribution of the charged chip mass 102) in the digester 100. FIG. 12 shows temperature distribution of the charged chip mass 102 in the depth direction L and FIG. 13 shows temperature distribution of the charged chip mass 102 in the depth direction L and circumferential inner wall direction R of the digester. Now the H factor showing the extent of digestion of the charged chip mass 102 is given by the following function $$H = \exp(B - A/T) dt$$

where

T . . . the digesting temperature

A, B . . . the constants of Broom

The digestion time is converted to the velocity with which the charged chip mass 102 in the digester 100 is moved. Thus $$t = f(L)$$

where

L: the function of a distance from the inlet of the digester 100

Hence $$H = K \cdot \exp(B - A/T) dL$$

The H factor is so defined as being proportional to the area of a portion enclosed with a function of the temperature (T) and distance (L) in a graph plotted to the right of FIG. 12.

According to the present invention as set out above in more detail, it is possible to provide a digester temperature distribution control system which can measure the temperature distribution of a charged chip mass in the digester without blocking any flow of the charged chip mass through the digester and can control temperature so as to allow the charged chip mass to take on a proper temperature distribution.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A system for controlling temperature distribution of a charged chip mass in a digester, said digester having an inner wall, filters and a control valve for controlling steam so as to heat a charged chip mass, said system comprising:

an optical fiber type temperature measuring unit provided between the inner wall of the digester and said filters disposed in the digester, for detecting temperature at a plurality of points in a length thereof including a predetermined reference point in the digester, the optical fiber type temperature measuring unit utilizing the Raman scattering effect a reference temperature measuring unit provided at the reference point in the digester and measuring a reference point temperature signal as a reference temperature signal;

a reference point temperature setting unit for setting a temperature on the reference point at the optical fiber type temperature measuring unit by calibrating the reference point temperature signal which is output from the optical fiber type temperature measuring unit by a reference temperature signal measured by the reference temperature measuring unit;

a measured temperature distribution calculating unit for calculating a measured temperature distribution in depth direction of the charged chip mass of the digester on the basis of the reference point temperature signal output from the reference point temperature setting unit and temperature signals on the plurality of points output from the optical fiber type temperature measuring unit;

a target temperature distribution calculating unit for calculating a target temperature distribution of the charged chip mass in the digester on the basis of a target quantity of pulp production and temperature gradient restriction of the digester; and control means for controlling the control values to allow a difference between the measured temperature distribution and the target temperature distribution set to be in a range of the control values.

2. The digester temperature distribution control system according to claim 1, wherein the optical fiber temperature measuring unit is suspended in a substantially vertical direction in the digester.

3. The digester temperature distribution control system according to claim 1, wherein the optical fiber type measuring unit is helically arranged on a circumferential inner wall of the digester.

4. The digester temperature distribution control system according to claim 1, wherein the optical fiber type temperature measuring unit is helically arranged on an outer peripheral wall of the digester.

5. The digester temperature distribution control system according to claim 1, wherein the optical fiber type temperature measuring unit is helically arranged on a center pipe of the digester.

6. The digester temperature distribution control system according to claim 1, wherein the measured temperature distribution calculating unit includes means for calculating a measured temperature distribution in a circumferential direction of the charged chip mass in the digester on the basis of the reference point temperature signal output from the reference point temperature signal output from the reference point setting unit and temperature signals on the plurality of points output from the optical fiber type temperature measuring unit.

7. The digester temperature distribution control system according to claim 1, wherein the target temperature distribution calculating unit includes means for calculating a target temperature distribution in a circumferential inner wall direction of the charged chip mass in the digester on the basis of a target quantity of pulp production and temperature gradient restriction.

\* \* \* \* \*